(12) United States Patent
Ikeda et al.

(10) Patent No.: US 11,179,988 B2
(45) Date of Patent: Nov. 23, 2021

(54) COOLING DEVICE FOR AMPHIBIOUS VEHICLE AND AMPHIBIOUS VEHICLE

(71) Applicant: MITSUBISHI HEAVY INDUSTRIES, LTD., Tokyo (JP)

(72) Inventors: Takashi Ikeda, Tokyo (JP); Tetsuya Miyamoto, Tokyo (JP); Katsuhiko Nakajo, Tokyo (JP); Takashi Matsunaga, Tokyo (JP); Taichi Omura, Tokyo (JP); Yuta Shimizu, Tokyo (JP); Takenori Kawana, Tokyo (JP); Takashi Mizumoto, Tokyo (JP); Shinichi Sato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 82 days.

(21) Appl. No.: 16/618,063

(22) PCT Filed: Dec. 14, 2017

(86) PCT No.: PCT/JP2017/044872
§ 371 (c)(1),
(2) Date: Nov. 27, 2019

(87) PCT Pub. No.: WO2019/016975
PCT Pub. Date: Jan. 24, 2019

(65) Prior Publication Data
US 2021/0122203 A1    Apr. 29, 2021

(30) Foreign Application Priority Data
Jul. 19, 2017 (JP) .............................. JP2017-140113

(51) Int. Cl.
*B60F 3/00* (2006.01)
*F01P 5/06* (2006.01)
(Continued)

(52) U.S. Cl.
CPC .......... *B60F 3/0053* (2013.01); *B60F 3/0007* (2013.01); *F01P 3/18* (2013.01);
(Continued)

(58) Field of Classification Search
CPC ......... B60F 3/0053; B60F 3/0007; F01P 3/18; F01P 5/06; F01P 5/10; F01P 11/0276
See application file for complete search history.

(56) References Cited

U.S. PATENT DOCUMENTS 4,730,664 A * 3/1988 Forsthuber ............ B60F 3/0053
123/41.02
6,358,109 B1   3/2002 Neisen
(Continued)

FOREIGN PATENT DOCUMENTS

JP            4-49633 U      4/1992
JP         2001-173443 A     6/2001
(Continued)

*Primary Examiner* — Jacob M Amick
(74) *Attorney, Agent, or Firm* — Birch, Stewart, Kolasch & Birch, LLP

(57) ABSTRACT

This cooling device for an amphibious vehicle includes: a heat exchanger mounted in the amphibious vehicle; a coolant introduction passage through which cooling air or cooling water can be introduced from the outside to the heat exchanger as a coolant; a cooling air discharge passage through which the cooling air having passed through the heat exchanger can be discharged to a cooling air discharge portion communicating with the outside; and a cooling water discharge passage through which the cooling water having passed through the heat exchanger can be discharged to a cooling water discharge portion communicating with the outside. The cooling air discharge passage and the cooling water discharge passage are formed such that at least the cooling air discharge portion and the cooling water discharge portion are independent of each other.

14 Claims, 7 Drawing Sheets

(51) Int. Cl.
  *F01P 3/18* (2006.01)
  *F01P 5/10* (2006.01)
  *F01P 11/02* (2006.01)

(52) U.S. Cl.
  CPC .................. *F01P 5/06* (2013.01); *F01P 5/10* (2013.01); *F01P 11/0276* (2013.01)

(56) References Cited

U.S. PATENT DOCUMENTS

2005/0272324 A1  12/2005  Gibbs
2007/0119157 A1   5/2007  Longdill et al.
2009/0107649 A1   4/2009  Longdill et al.

FOREIGN PATENT DOCUMENTS

| JP | 2006-509138 A | 3/2006 |
| JP | 2008-521679 A | 6/2008 |
| JP | 2008-521680 A | 6/2008 |
| JP | 2013-136290 A | 7/2013 |
| JP | 5797111 B2 | 10/2015 |

\* cited by examiner

COOLING DEVICE FOR AMPHIBIOUS VEHICLE AND AMPHIBIOUS VEHICLE

TECHNICAL FIELD

The present disclosure relates to a cooling device for an amphibious vehicle capable of switching between a land mode and a water mode and an amphibious vehicle having the cooling device mounted therein.

BACKGROUND

Although an amphibious vehicle is generally mainly used for leisure, there is an increasing need to land on an isolated area via sailing on the water during an earth quake or a disaster, and an amphibious vehicle intended for use in long-distance sailing on the water is required. Such an amphibious vehicle has a heat generation source including a power source such as an internal combustion engine or an electric motor, and a cooling device for cooling these components is mounted in order to realize stable operation of the amphibious vehicle.

Patent Document 1 discloses an amphibious vehicle operated in a land mode and a water mode in which an air-liquid heat exchanger capable of exchanging heat with ambient air during the land mode and a liquid-liquid heat exchanger capable of exchanging heat with ambient water during the water mode are mounted.

CITATION LIST

Patent Literature

Patent Document 1: JP2008-521679A

SUMMARY

Technical Problem

In a cooling device for an ordinary vehicle such as an automobile or a vessel, one type of coolant is generally used for one heat exchanger. In Patent Document 1, an amphibious vehicle has mounted therein two types of heat exchangers corresponding to a land mode and a water mode using features that the amphibious vehicle is used on both land and water. Such a configuration is reasonable in that, since a traveling load is large and a heat generation amount increases in the water mode as compared to the land mode, an air-liquid heat exchanger having better cooling performance than an air-air heat exchanger is used in the water mode. However, mounting two types of heat exchangers may increase an occupying volume of a vehicle to increase limitations on a vehicle layout and the weight of an entire vehicle.

At least one embodiment of the present invention has been made in view of the above-described problems, and an object thereof is to provide a cooling device for an amphibious vehicle effective in improving layout efficiency and reducing a vehicle weight while obtaining a satisfactory cooling effect according to an operation state of the amphibious vehicle and to provide an amphibious vehicle including the cooling device.

Solution to Problem (1) A cooling device for an amphibious vehicle according to some embodiments of the present invention includes: a heat exchanger mounted in the amphibious vehicle; a coolant introduction passage through which cooling air or cooling water can be introduced from the outside to the heat exchanger as a coolant; a cooling air discharge passage through which the cooling air having passed through the heat exchanger can be discharged to a cooling air discharge portion communicating with the outside; and a cooling water discharge passage through which the cooling water having passed through the heat exchanger can be discharged to a cooling water discharge portion communicating with the outside. The cooling air discharge passage and the cooling water discharge passage are formed such that at least the cooling air discharge portion and the cooling water discharge portion are independent from each other.

According to the configuration of (1), the cooling air discharge passage and the cooling water discharge passage through which the cooling air and the cooling water having passed through the heat exchanger are discharged respectively, are formed such that at least the cooling air discharge portion and the cooling water discharge portion are independent from each other. Therefore, the cooling air or the cooling water which is a plurality of coolants introduced from the outside of the vehicle can be taken into the heat exchanger and be used. Due to this, the heat exchanger can be operated using the cooling air as a coolant during the land mode and using the cooling water as a coolant during the water mode. As a result, a satisfactory cooling effect is obtained according to a traveling state of the vehicle while suppressing the number of heat exchangers mounted. Moreover, by decreasing the occupying volume of the heat exchanger in the vehicle, it is possible to improve the degree of freedom in the layout of a vehicle and it is effective in reducing the weight of an entire vehicle.

(2) In some embodiments, the configuration of (1) further includes: a passage switching portion configured to be able to selectively switch a discharge destination of the coolant having passed through the heat exchanger to any one of the cooling air discharge passage and the cooling water discharge passage.

According to the configuration of (2), it is possible to selectively switch a passage reaching a discharge destination to any one of the cooling air discharge passage and the cooling water discharge passage according to the type (the cooling air or the cooling water) of the coolant introduced into the cooling device. In this way, the coolants can be reliably guided into the respective corresponding passages.

(3) In some embodiments, in the configuration of (2), the passage switching portion includes: an opening communicating between the cooling air discharge passage and the cooling water discharge passage; a diaphragm attached to the opening from a side close to the cooling water discharge passage; and a biasing member that elastically biases the diaphragm toward the opening.

According to the configuration of (3), when a cooling water does not flow into the cooling water discharge passage (for example, during the land mode), the diaphragm is biased toward the opening by the biasing member of the passage switching portion whereby the opening is blocked. In this case, the cooling air introduced from the coolant introduction passage forms a passage in which the cooling air is discharged outside from the cooling air discharge passage without entering the cooling water discharge passage after passing through the heat exchanger. On the other hand, when the cooling water is introduced into the cooling air discharge passage (for example, during the water mode), since a resistance larger than the biasing force of the biasing member is applied due to the cooling water having a larger specific gravity than the cooling air whereby the diaphragm is open, the cooling water flows into the opening. In this case, the cooling water introduced from the coolant introduction passage forms a passage in which the cooling water is discharged outside from the cooling water discharge passage via the opening after passing through the heat exchanger.

In this manner, in a situation in which the vehicle is in the land mode and the cooling air flows into the cooling device, since the opening reaching the cooling water discharge passage is closed, the cooling air is reliably guided to the cooling air discharge passage. On the other hand, in a situation in which the vehicle is in the water mode and the cooling water flows into the cooling device, since the opening is automatically open by the cooling water, the cooling water is reliably guided to the cooling water discharge passage. Such a passage switching portion can reliably switch the passage of the coolant flowing into the cooling device without requiring an active device such as an actuator which consumes energy.

(4) In some embodiments, in the configuration of any one of (1) to (3), the cooling air discharge passage has a fan provided closer to a downstream side than a branch point between the cooling water discharge passage and the cooling air discharge passage.

According to the configuration of (4), since the cooling air discharge passage has a blowing fan provided closer to a downstream side than the branch point between the cooling air discharge passage and the cooling water discharge passage, it is possible to accelerate introduction or discharge of the cooling air into or from the heat exchanger by driving the fan during the land mode. Since entering of the cooling water into the cooling air discharge passage in which the fan is disposed is prevented as described above, the fan is not exposed to the cooling water and a stable operation can be secured for a long period.

(5) In some embodiments, in the configuration of any one of (1) to (4), a downstream side of the cooling air discharge passage in relation to a branch point between the cooling water discharge passage and the cooling air discharge passage is located above a waterline of the amphibious vehicle.

According to the configuration of (5), since the side of the cooling air discharge passage closer to the downstream side than the branch point between the cooling water discharge passage and the cooling air discharge passage is positioned above the waterline of the amphibious vehicle, water does not enter a portion of the cooling air discharge passage near the cooling air discharge portion during the water mode of the vehicle, and deterioration resulting from corrosion can be prevented.

(6) In some embodiments, in the configuration of any one of (1) to (5), a propulsion device that generates a propulsion force using the cooling water having passed through the heat exchanger is disposed in the cooling water discharge passage.

According to the configuration of (6), since the propulsion device is disposed in the cooling water discharge passage, it is possible to stably generate a propulsion force using the cooling water having passed through the heat exchanger during the water mode. Since the propulsion device sucks in the cooling water, intake of the cooling water into the heat exchanger disposed on the upstream side is accelerated and a satisfactory cooling effect is obtained.

(7) In some embodiments, the configuration of (6) further includes: a bypass passage that communicates with the coolant introduction passage and the cooling water discharge passage, and a portion of the coolant flowing through the coolant introduction passage can be supplied to the propulsion device through the bypass passage without passing through the heat exchanger.

According to the configuration of (7), the cooling device further includes the bypass passage that communicates with the coolant introduction passage and the cooling water discharge passage. During the water mode, it may be difficult to secure an amount of water sufficient for the propulsion device with the cooling water having passed through the heat exchanger depending on the vehicle state. In such a case, in this configuration, it is possible to secure an amount of water sufficient for propulsion via the bypass passage.

(8) In some embodiments, the configuration of any one of (1) to (7) further includes: a pump capable of pumping the cooling water to the coolant introduction passage.

According to the configuration of (8), the cooling device further includes a pump capable of pumping the cooling water to the coolant introduction passage. Therefore, it is possible to forcibly pump the cooling water using the pump even when the waterline falls, for example, and to supply the cooling water stably to the heat exchanger.

(9) In some embodiments, the configuration of (8) further includes: a spraying portion capable of spraying the cooling water pumped by the pump toward the heat exchanger from an upper side.

According to the configuration of (9), since the cooling device further includes the spraying portion capable of spraying the cooling water pumped by the pump toward the heat exchanger from the upper side, the cooling water can be supplied to the heat exchanger uniformly. As a result, a stable and high cooling effect can be obtained during the water mode.

(10) In some embodiments, in the configuration of any one of (1) to (9), the cooling air discharge passage and the cooling water discharge passage have a shared space provided on a side close to the heat exchanger, and the shared space is configured to be able to store the cooling water by being partitioned by a partition member and has a drain passage through which the stored cooling water can be discharged.

According to the configuration of (10), since the cooling water is stored in the shared space, it is possible to allow the heat exchanger to be submerged in the cooling water stored in the shared space and to obtain a stable and high cooling effect regardless of the vehicle state during the water mode.

(11) In some embodiments, in the configuration of (10), the partition member extends from a floor of the shared space until reaching a side above the heat exchanger.

According to the configuration of (11), since the partition member extends from the floor of the shared space until reaching a side above the heat exchanger, it is possible to store the cooling water until reaching a side above the heat exchanger. Due to this, it is possible to allow the heat exchanger to be reliably submerged in the cooling water stored in the shared space and to obtain a stable and high cooling effect.

(12) In some embodiments, in the configuration of (10) or (11), the cooling air discharge portion is provided on a side above the partition member.

According to the configuration of (12), since the cooling air discharge portion is provided on a side above the partition member, the cooling air discharge portion can be satisfactorily isolated from the cooling water stored in the shared space.

(13) In some embodiments, in the configuration of any one of (10) to (12), the drain passage is configured such that the drain passage is open at a timing at which the amphibious vehicle switches from a water mode to a land mode whereby the cooling water stored in the shared space is discharged.

According to the configuration of (13), since the drain passage is closed during the water mode of the vehicle, the cooling water is stored in the shared space and the heat exchanger is submerged in the cooling water. When the water mode switches to the land mode, the drain passage is open and the cooling water stored in the shared space is discharged. In this way, it is possible to reduce the vehicle weight by discharging the cooling water stored during the water mode and to take in the cooling air used during the land mode into the empty shared space. By opening and closing the drain passage in this manner, it is possible to cool the heat exchanger according to an operation state (the water mode or the land mode) of the vehicle.

(14) An amphibious vehicle according to some embodiments of the present invention includes the cooling device according to the configuration of any one of (1) to (13).

According to the configuration of (14), since the amphibious vehicle includes the cooling device (including the above-described various aspects), it is possible to cool the heat exchanger appropriately and sufficiently according to the operation state (the land mode or the water mode) and to provide a stable traveling performance under various environments.

Advantageous Effects

According to at least one embodiment of the present invention, it is possible to provide a cooling device for an amphibious vehicle effective in improving layout efficiency and reducing a vehicle weight while obtaining a satisfactory cooling effect according to an operation state of the amphibious vehicle and to provide an amphibious vehicle including the cooling device.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
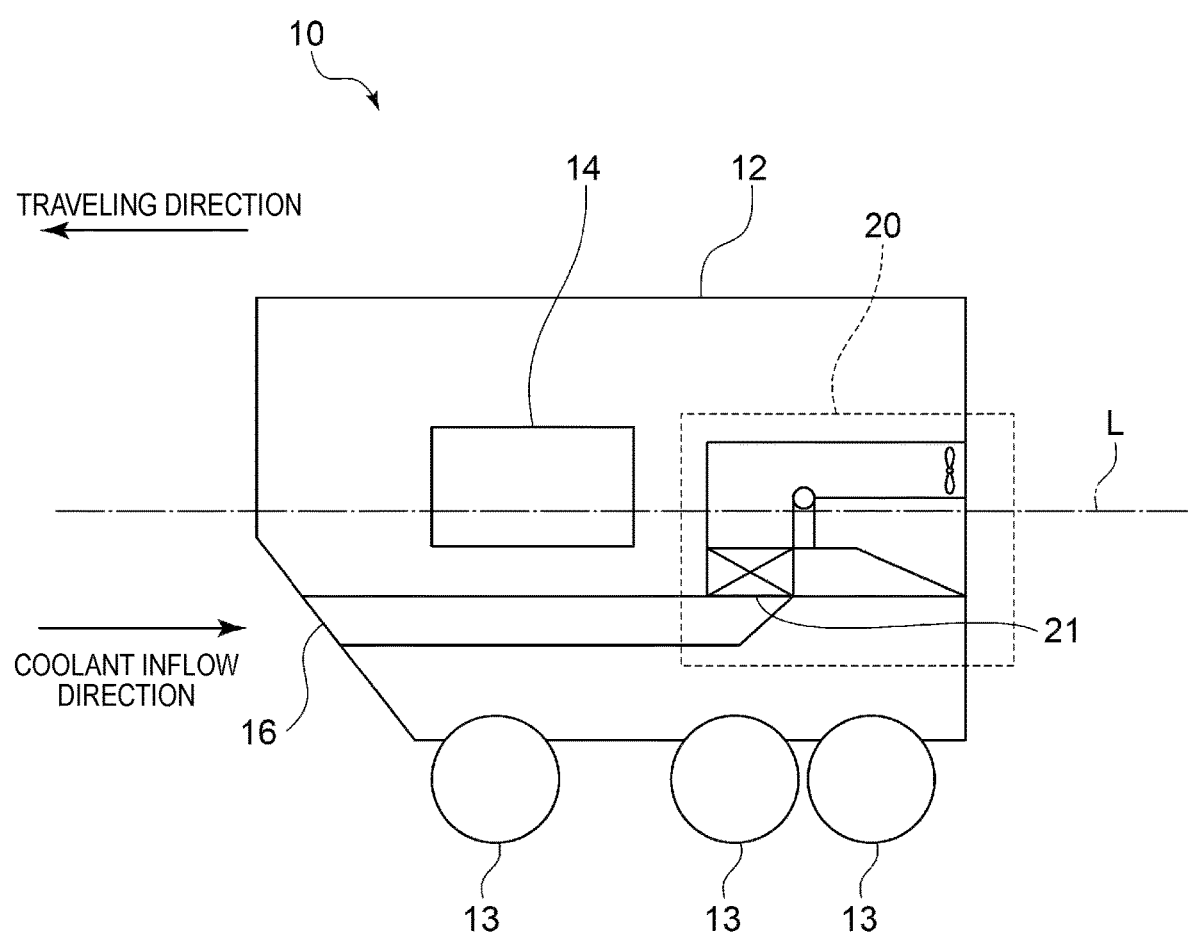
FIG. 1 is a schematic diagram illustrating an overall configuration of an amphibious vehicle including a cooling device according to an embodiment of the present invention.

First, referring to FIG. 1, an overall configuration of an amphibious vehicle 10 including a cooling device 20 according to an embodiment of the present invention will be described. FIG. 1 is a schematic diagram illustrating an overall configuration of the amphibious vehicle 10 including the cooling device 20 according to an embodiment of the present invention.

As illustrated in FIG. 1, the amphibious vehicle 10 has a vehicle body 12 having an approximately rectangular parallelepiped shape. A plurality of vehicle wheels 13 to which drive force from an engine 14 is transmitted via a power transmission means (not illustrated) during a land mode are provided on the lower side of the vehicle body 12. Moreover, a water thruster (not illustrated) including a propeller or a water jet to which drive force from the engine 14 is transmitted via a power transmission means (not illustrated) during a water mode is provided in the vehicle body 12. In this manner, the amphibious vehicle 10 is configured to be operable on water and land by driving the water thruster with the aid of the engine 14 during the water mode and rotating the vehicle wheels 13 with the aid of the engine 14 during the land mode.

The engine 14 mounted as a power source of the amphibious vehicle 10 is cooled by circulating a cooling water in a water jacket formed in a cylinder block (not illustrated), for example. In FIG. 1, such a cooling device 20 of the engine 14 is illustrated and the cooling device 20 includes a heat exchanger 21 for exchanging the heat of the cooling water circulating in the engine 14 with an outside coolant (a cooling air or a cooling water) to realize cooling.

In the embodiments to be described later, although an example in which the heat exchanger 21 realizes cooling by exchanging the heat of the cooling water of the engine 14 with an outside coolant is illustrated, the present invention is not limited thereto. For example, when a motor is used as the power source instead of the engine 14, the heat exchanger 21 may be a heat exchanger that exchanges heat with the cooling water for a motor. Moreover, the present invention can be applied to a heat exchanger and the like that forms a part of a cooling cycle used for air conditioning of vehicles and a heat exchanger used in an intercooler or an EGR cooler and the like.

In general, since air resistance during the land mode of an amphibious vehicle is larger than water resistance during the water mode, an engine load during the water mode increases relatively larger than that during the land mode, and as a result, a larger cooling amount is required during the water mode. Therefore, a coolant and the size of a cooling device desirable for cooling vehicles are different from land mode to water mode. Specifically, since the size of a heat exchanger required for cooling increases if air is used as a coolant during the water mode in which an engine load increases, it is desirable to obtain a large cooling effect with a small amount of coolant and it is desirable to take in a cooling water represent abundantly in the surroundings from the outside of a vehicle and use the cooling water as a coolant. On the other hand, since air is present in the surrounding during the land mode in which a relatively small cooling capacity is required, it is desirable to take in the air outside a vehicle and use the air as a coolant. Here, if one heat exchanger which uses a cooling water is used in the water mode and another heat exchanger which uses a cooling air is used in the land mode, it is necessary to mount a plurality of heat exchangers, which may increase limitations on the vehicle layout and may increase an occupying volume of a vehicle and the weight of an entire vehicle. Such a problem can be ideally eliminated by the respective embodiments to be described below.

First Embodiment

Figure 2:
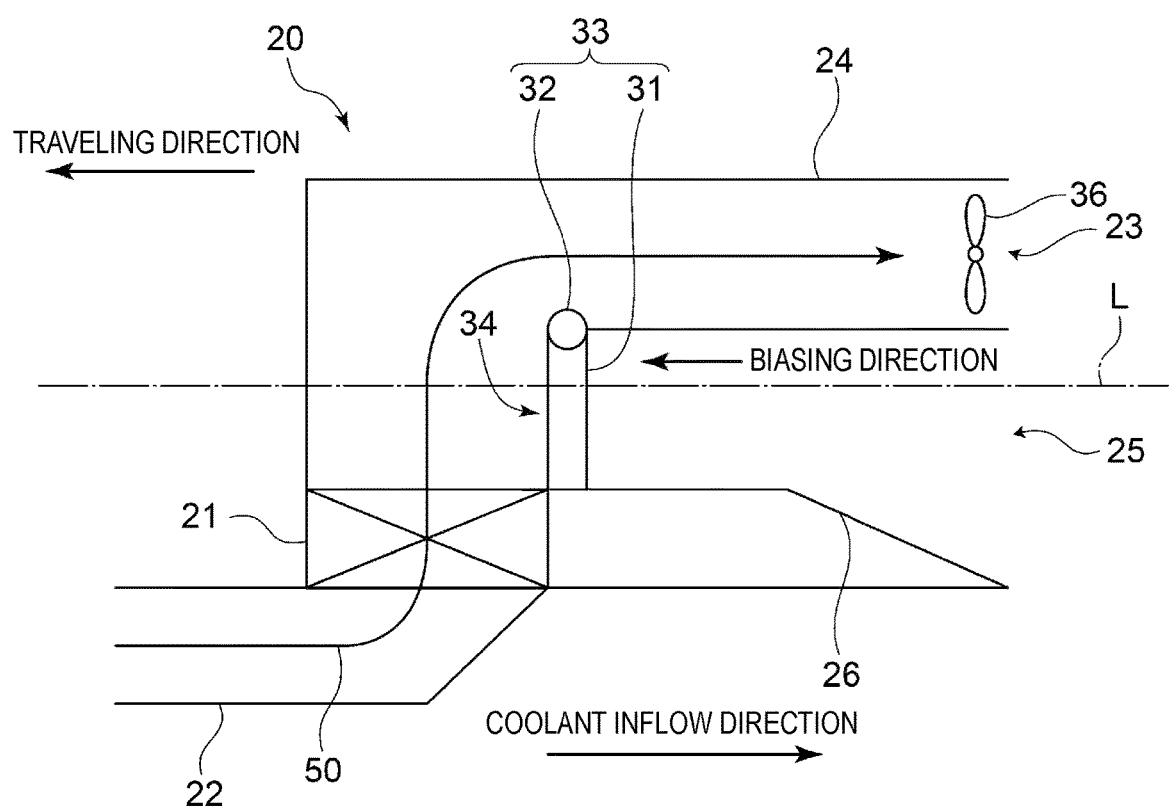
FIG. 2 is an enlarged view illustrating the flow of a cooling air during a land mode in the cooling device according to a first embodiment.
Figure 3:
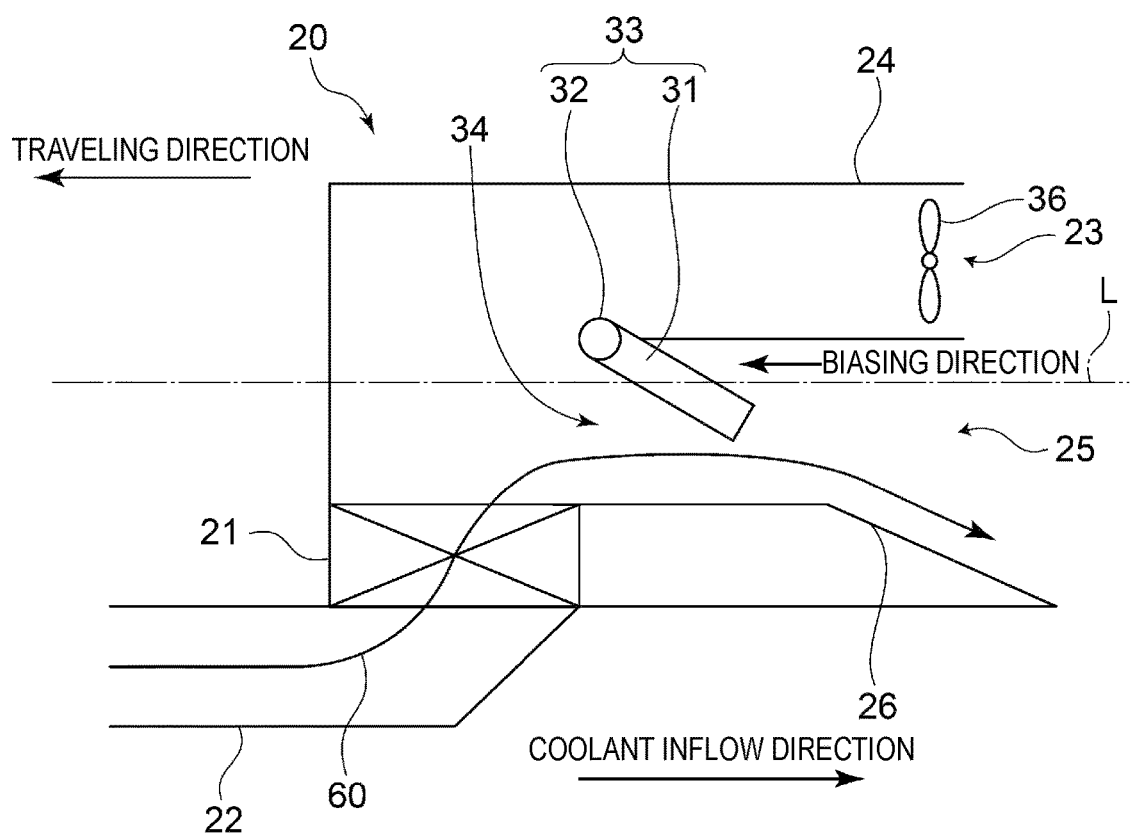
FIG. 3 is an enlarged view illustrating the flow of a cooling water during a water mode in the cooling device according to the first embodiment.

A first embodiment will be described with reference to FIGS. 2 and 3. FIG. 2 is an enlarged view illustrating the flow of a cooling air during a land mode in the cooling device 20 according to the first embodiment, and FIG. 3 is an enlarged view illustrating the flow of a cooling water during the water mode in the cooling device 20 according to the first embodiment.

The cooling device 20 includes the heat exchanger 21 mounted in the amphibious vehicle 10, a coolant introduction passage 22 through which a cooling air 50 or a cooling water 60 into the heat exchanger 21 can be introduced from the outside as a coolant, a cooling air discharge passage 24 through which the cooling air 50 having passed through the heat exchanger 21 can be discharged to a cooling air discharge portion 23 communicating with the outside, and a cooling water discharge passage 26 through which the cooling water 60 having passed through the heat exchanger 21 can be discharged to a cooling water discharge portion 25 communicating with the outside.

A vehicle travels along a traveling direction illustrated in the drawing, and with the travel, a coolant (the cooling air 50 or the cooling water 60) present around the vehicle flows into the coolant intake port 16 (see FIG. 1) from the outside of the vehicle. That is, the cooling air 50 is introduced into the coolant intake port 16 during the land mode and the cooling water 60 is introduced therein during the water mode.

In the present embodiment, introduction of the cooling air 50 and the cooling water 60 into the heat exchanger 21 is performed through a single common coolant introduction passage 22. However, the coolant introduction passage 22 may branch in the midway as long as the cooling air 50 and the cooling water 60 can be introduced into the heat exchanger 21, and dedicated intake ports may be provided independently for the cooling air 50 and the cooling water 60.

The coolant having passed through the heat exchanger 21 is discharged from the cooling air discharge portion 23 to the outside through the cooling air discharge passage 24 as illustrated in FIG. 2 when the coolant is the cooling air 50. On the other hand, when the coolant is the cooling water 60, the coolant is discharged from the cooling water discharge portion 25 to the outside through the cooling water discharge passage 26 as illustrated in FIG. 3.

The cooling air discharge passage 24 and the cooling water discharge passage 26 through which the cooling air 50 and the cooling water 60 having passed through the heat exchanger 21 pass are formed such that the cooling air discharge portion 23 and the cooling water discharge portion 25 are independent from each other. Therefore, the cooling air 50 or the cooling water 60 introduced from the outside of the vehicle can be taken into the heat exchanger 21 and be used. Due to this, a single heat exchanger 21 can be used by using the cooling air 50 as a coolant during the land mode and using the cooling water 60 as a coolant during the water mode. Therefore, it is possible to decrease the number of heat exchangers mounted in the vehicle. Moreover, by decreasing the occupying volume of the heat exchanger 21 in the vehicle, it is possible to improve the degree of freedom in the layout of a vehicle and it is effective in reducing the weight of an entire vehicle.

The cooling device 20 of the present embodiment further includes a passage switching portion 33 configured to be able to selectively switch a discharge destination of the coolant having passed through the heat exchanger 21 to any one of the cooling air discharge passage 24 and the cooling water discharge passage 26.

The passage switching portion 33 includes an opening 34 communicating between the cooling air discharge passage 24 and the cooling water discharge passage 26, a diaphragm 31 attached to the opening 34 from a side close to the cooling water discharge passage 26, and a biasing member 32 that biases the diaphragm 31 toward the opening 34. Here, the biasing member 32 is configured to bias the diaphragm 31 with a predetermined biasing force (elastic force) in a direction opposite to a coolant inflow direction and is a torsion coil spring, for example. The biasing force of the biasing member 32 is set to be stronger than a resistance when the cooling air 50 flows into the opening 34 and to be weaker than a resistance when the cooling water 60 flows into the opening 34. Therefore, the passage switching portion 33 of the present embodiment is configured so that the diaphragm 31 rises upward along the coolant inflow direction when a resistance larger than a biasing force is applied only (see FIG. 3).

According to the above-described configuration, although the cooling air 50 flows near the opening 34 during the land mode, since the resistance of the cooling air 50 is smaller than the biasing force of the biasing member 32, the diaphragm 31 does not rise upward, the opening 34 remains in a blocked state, and the cooling air 50 passes through the cooling air discharge passage 24 (see FIG. 2). On the other hand, since the resistance of the cooling water 60 having a larger specific gravity than the cooling air 50 increases during the water mode, the resistance becomes larger than the biasing force of the biasing member 32, the diaphragm 31 rises upward, the cooling water 60 flows into the opening 34, and the cooling water 60 passes through the cooling water discharge passage 26 (see FIG. 3).

As described above, in a situation in which the cooling air 50 flows into the cooling device 20 during the land mode, since the opening 34 reaching the cooling water discharge passage 26 is closed, the cooling air 50 is guided into the cooling air discharge passage 24 and will not flow into the cooling water discharge passage 26. On the other hand, in a situation in which the cooling water 60 flows into the cooling device 20 during the water mode, since the opening 34 is automatically open by the cooling water 60, the cooling water 60 is guided into the cooling water discharge passage 26 (since the cooling air discharge passage 24 is provided above the waterline, the cooling water 60 will not flow into the cooling air discharge passage 24). Therefore, the passage switching portion 33 can appropriately switch a passage depending on a coolant flowing into the cooling device 20 without requiring an active driving mechanism such as an actuator.

In the present embodiment, the cooling device further includes a fan 36 provided in the cooling air discharge passage 24 closer to a downstream side than a branch point between the cooling air discharge passage 24 and the cooling water discharge passage 26. The fan 36 can be driven by electric power supplied from a battery (not illustrated) mounted in the vehicle, for example, and is configured to generate a negative pressure by being driven during the land mode to promote introduction of the cooling air 50 into the heat exchanger 21 and discharge of the cooling air 50 from the heat exchanger 21.

The fan 36 is disposed in a side of the cooling air discharge passage 24 closer to the downstream side (near the cooling air discharge portion 23) than the branch point between the cooling air discharge passage 24 and the cooling water discharge passage 26. The position at which the fan 36 is disposed in the cooling air discharge passage 24 is near the cooling air discharge portion 23, and is a region in which entering of the cooling water 60 is prevented as described above. Therefore, the fan 36 is not exposed to the cooling water 60 during the water mode and deterioration due to corrosion is suppressed. Therefore, the fan 36 can perform a stable operation for a long period.

Second Embodiment

Figure 4:
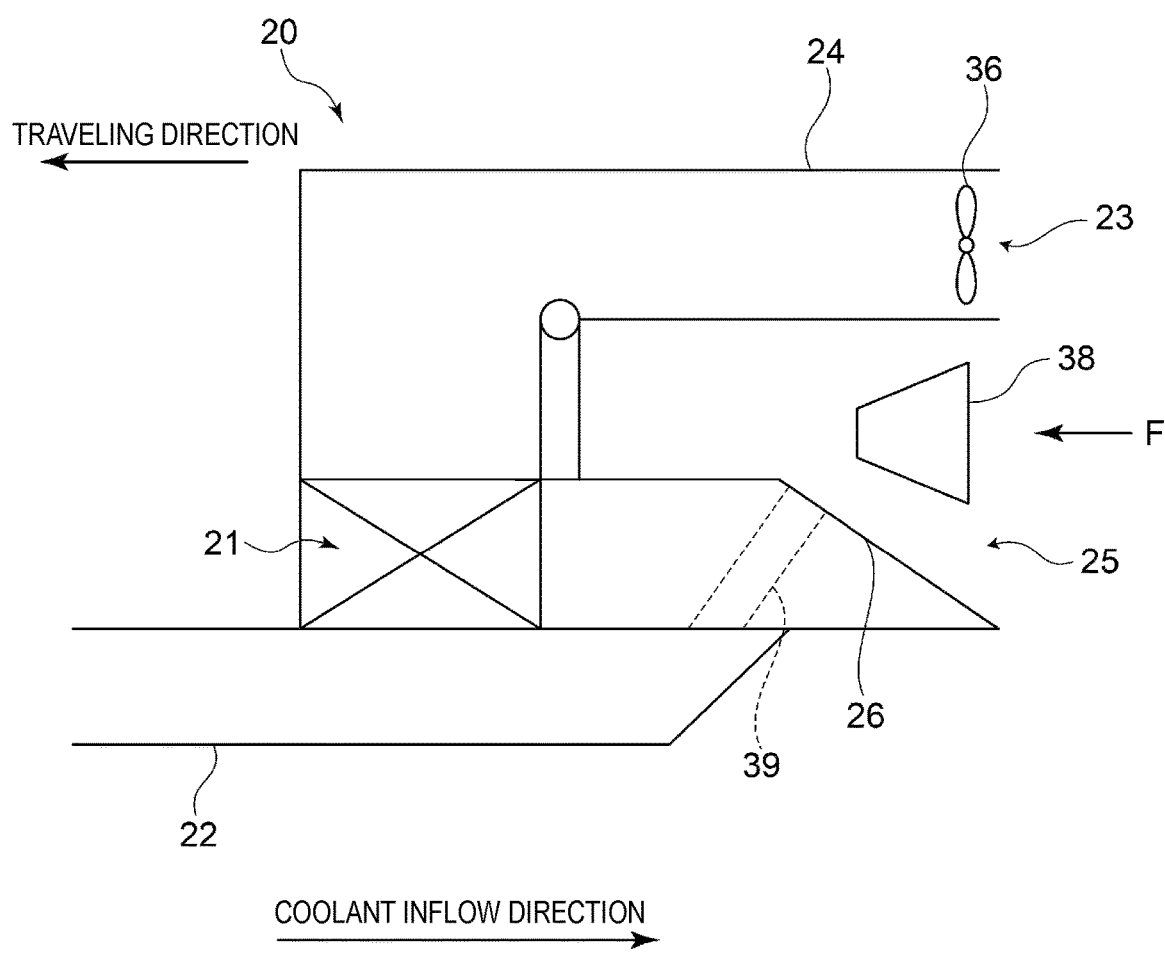
FIG. 4 is a diagram illustrating a cooling device according to a second embodiment.

Next, a second embodiment will be described with reference to FIG. 4. FIG. 4 is a diagram illustrating the cooling device 20 according to the second embodiment. In the following description, components corresponding to those of the above-described embodiment will be denoted by the same reference numerals, and redundant description thereof will be omitted unless particularly stated otherwise.

The cooling device 20 according to the second embodiment includes a propulsion device 38 provided in the cooling water discharge passage 26. The propulsion device 38 is an element that forms a part of a water thruster serving as a power source during the water mode. For example, the propulsion device 38 obtains a drive force from the engine 14 of the vehicle to suck the cooling water 60 having passed through the heat exchanger 21 to generate a propulsion force F. The propulsion device 38 is a screw or a water jet, for example.

During the water mode, similarly to the first embodiment, although a flow in which the cooling water 60 flows into the cooling device 20 and flows from the heat exchanger 21 to reach the cooling water discharge portion 25 occurs, such a flow is further accelerated by the propulsion device 38. In general, when a vehicle decreases a speed in order to turn during the water mode and a strong wind blows in a direction opposite to the traveling direction of the vehicle, the amount of the cooling water 60 flowing into the cooling device 20 becomes smaller than a normal amount during the water mode. In such a situation, although the heat exchanger 21 is in a heavy load state like the water mode, the inflow amount of the cooling water 60 becomes insufficient and it may be difficult to secure a necessary cooling amount.

In the second embodiment, since the propulsion device 38 is provided in the cooling water discharge passage 26, the cooling water 60 can be forcibly taken in by the propulsion device 38 in an operation state in which it is likely that the amount of the cooling water 60 introduced into the heat exchanger 21 becomes insufficient. As a result, it is possible to secure stable intake of the cooling water 60 into the heat exchanger 21 and sufficiently secure a necessary cooling amount regardless of a water operation state of the vehicle.

The cooling device 20 further includes a bypass passage 39 communicating with the coolant introduction passage 22 and the cooling water discharge passage 26. Therefore, a portion of the cooling water 60 flowing through the coolant introduction passage 22 can be supplied to the propulsion device 38 via the bypass passage 39 without passing through the heat exchanger 21.

The above-described propulsion device 38 operates by sucking a certain amount of water and generates a propulsion force F. However, depending on a vehicle state during the water mode, it may be difficult to secure an amount of water necessary for the propulsion device 38 to generate a sufficient propulsion force with the cooling water 60 only having passed through the heat exchanger 21. Therefore, in the present embodiment, since the bypass passage 39 is provided, it is possible to secure a surplus amount of water required for the propulsion device 38 via the bypass passage 39 and to obtain a stable propulsion performance. When the vehicle switches from the land mode to the water mode, although a considerable amount of time is required until the cooling water 60 reaches an empty cooling water discharge passage 26, by providing the bypass passage 39 in this manner, it is possible to shorten the time and to complete the switching to the water mode at an earlier timing.

The bypass passage 39 may be configured so that the cooling water discharge passage 26 communicates with the outside of a vehicle. In this case, the cooling water 60 may be pumped from the outside of the vehicle to the cooling water discharge passage 26 using a pump that can be driven with electric power supplied from a battery (not illustrated) mounted in the vehicle, for example.

Third Embodiment

Figure 5:
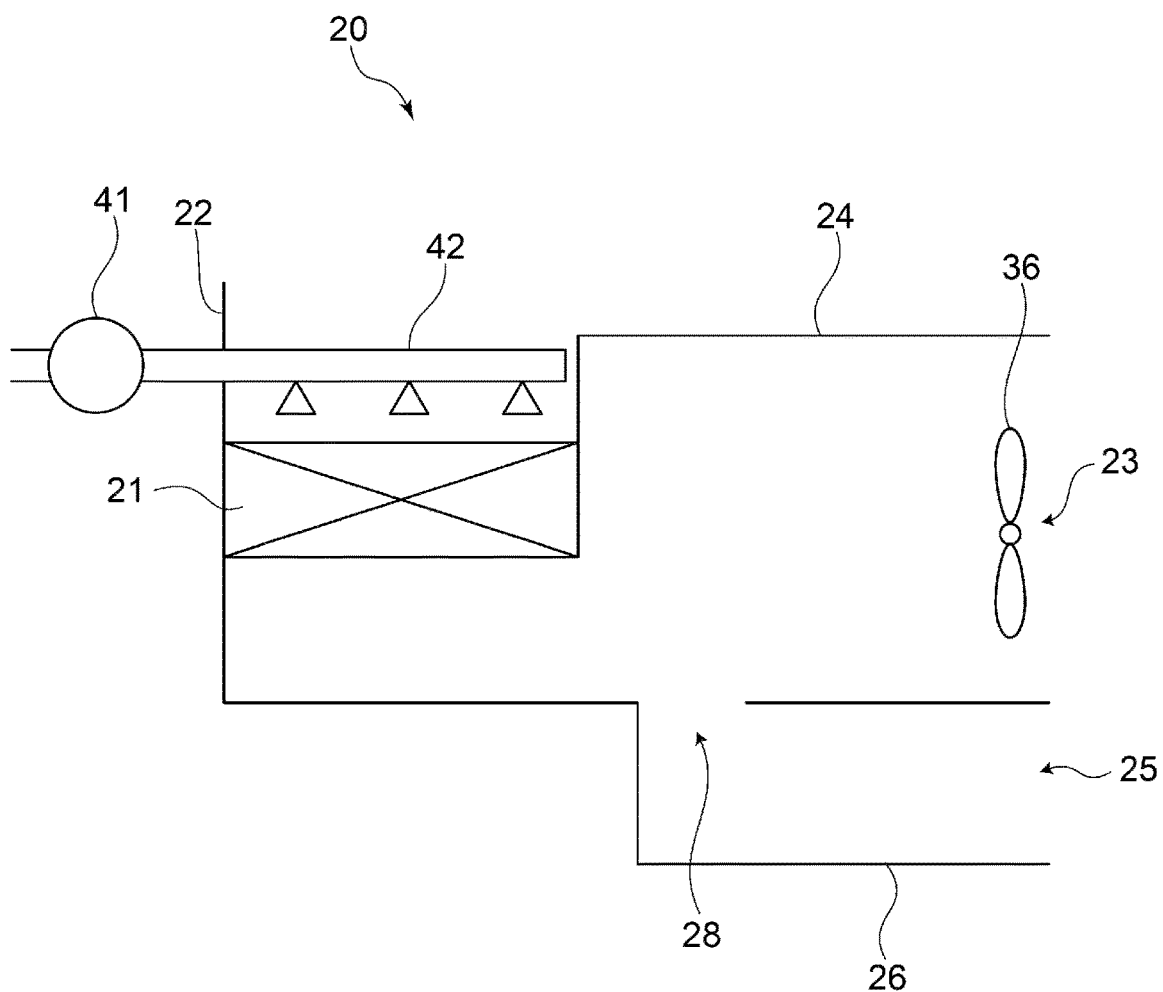
FIG. 5 is a diagram illustrating a cooling device according to a third embodiment.

Next, a third embodiment will be described. FIG. 5 is a diagram illustrating the cooling device 20 according to the third embodiment. In the following description, components corresponding to those of the above-described embodiment will be denoted by the same reference numerals, and redundant description thereof will be omitted unless particularly stated otherwise.

In the third embodiment, the cooling device 20 further includes a pump 41 capable of pumping the cooling water 60 to the coolant introduction passage 22.

It is desirable that the heat exchanger 21 is disposed under the water surface in order to obtain a sufficient cooling amount for the heat exchanger 21. However, when a sailing speed of the vehicle increases, the vehicle body may float due to aerodynamic lift, and as a result, the heat exchanger 21 may be exposed to the water surface. Therefore, in the present embodiment, since the pump 41 capable of pumping the cooling water 60 to the coolant introduction passage 22, even when the waterline L falls below the upper part of the heat exchanger 21 as described above, it is possible to stably secure a satisfactory cooling amount by forcibly pumping the cooling water 60 using the pump 41 and supplying the cooling water 60 to the cooling device 20.

In the present embodiment, a spraying portion 42 capable of spraying the cooling water 60 pumped by the pump 41 toward the heat exchanger 21 from an upper side. Due to such a configuration, it is possible to supply the cooling water 60 to the heat exchanger 21 uniformly regardless of the operation state of the vehicle. As a result, a stable and satisfactory cooling amount is obtained in the water mode.

In the present embodiment, during the water mode, the cooling water is pumped by the pump 41 and flows into the heat exchanger 21 from an upper side, and after passing through the heat exchanger 21, the cooling water passes through the opening 28 and is discharged to the cooling water discharge passage 26 so that the cooling water flows downward and falls due to its own weight. On the other hand, during the land mode, the cooling air 50 is supplied to the heat exchanger 21 via the coolant introduction passage 22, and after passing through the heat exchanger 21, the cooling air 50 is discharged from the cooling air discharge portion 23 by the fan 36 provided on the downstream side of the cooling air discharge passage 24.

Figure 6:
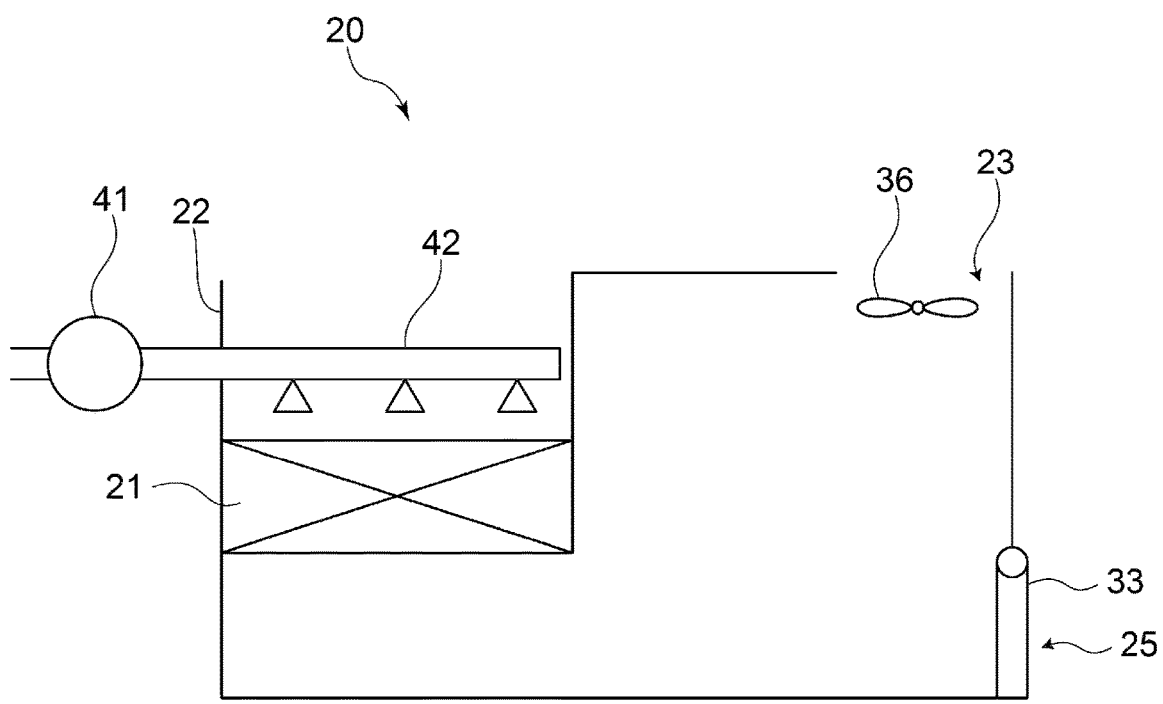
FIG. 6 is a modified embodiment of FIG. 5.

In the present embodiment, although the cooling air discharge passage 24 and the cooling water discharge passage 26 are configured to be independent from each other, the cooling water discharge passage 26 may be omitted as illustrated in FIG. 6, and the cooling air discharge portion 23 and the cooling water discharge portion 25 only may be independent from each other. Due to such a configuration, it is possible to simplify an internal structure of the cooling device 20.

Fourth Embodiment

Figure 7:
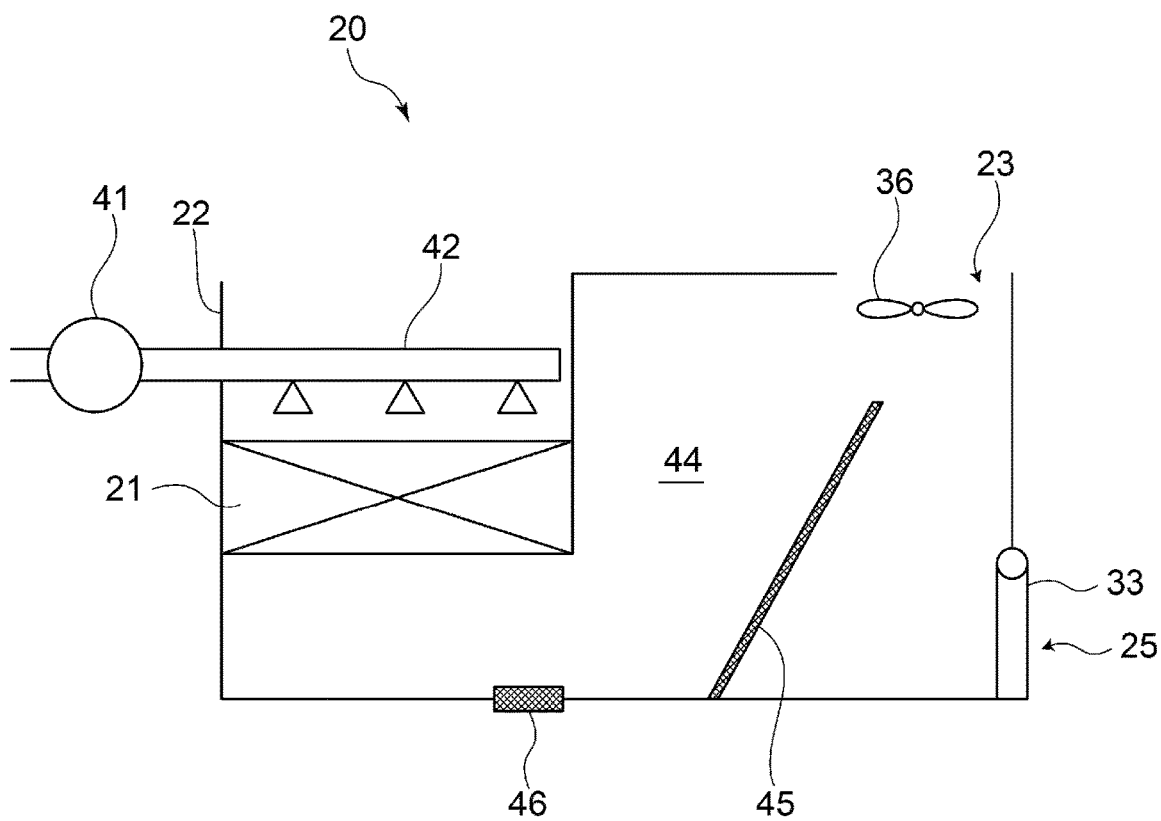
FIG. 7 is a diagram illustrating a cooling device including a partition member and a drain passage according to an embodiment.

Next, a fourth embodiment will be described with reference to FIG. 7. FIG. 7 is a diagram illustrating the cooling device 20 according to the fourth embodiment. In the following description, components corresponding to those of the above-described embodiment will be denoted by the same reference numerals, and redundant description thereof will be omitted unless particularly stated otherwise.

In the present embodiment, the cooling air discharge passage 24 and the cooling water discharge passage 26 have a shared space 44 provided on a side closer to the heat exchanger 21. The shared space 44 is configured to be able to store the cooling water 60 by being partitioned by a partition member 45. A drain passage 46 is provided in the shared space 44 so that the cooling water 60 stored in the shared space 44 can be discharged. The drain passage 46 is configured to communicate with the outside of the vehicle, for example.

As described above, it is desirable to dispose the heat exchanger 21 under the water surface in order to secure a sufficient cooling amount during the water mode.

According to the present embodiment, by storing the cooling water 60 in the shared space 44, it is possible to dispose the heat exchanger 21 in the stored cooling water 60 under the water surface regardless of the vehicle state during the water mode. In this way, it is possible to obtain a sufficient cooling amount stably.

As illustrated in FIG. 7, the partition member 45 that partitions the shared space 44 extends from the floor of the shared space 44 until reaching a side above the heat exchanger 21. Therefore, during the water mode, a cooling water sufficient for dipping the heat exchanger 21 completely can be stored in the shared space 44.

The cooling air discharge portion 23 is provided above the partition member 45. Therefore, during the water mode, the cooling air discharge portion 23 is satisfactorily isolated from the cooling water stored in the shared space 44 and corrosion can be prevented effectively.

The drain passage 46 enters an open state at a timing at which the amphibious vehicle 10 switches from the water mode to the land mode whereby the cooling water 60 stored in the shared space 44 is discharged. For example, when the amphibious vehicle 10 switches from the water mode to the land mode, the power is switched from the propulsion device to the vehicle wheels 13 by a transfer whereby the drain passage 46 may be open or closed.

More specifically, since the drain passage 46 is closed during the water mode of the vehicle, although the cooling water 60 is stored in the shared space 44, the cooling water 60 stored in the shared space 44 is discharged when the vehicle switches to the land mode and the drain passage 46 is open. In this way, the cooling air 50 can be taken into a region of the shared space 44 occupied by the cooling water.

While the embodiment of the present invention has been described, the present invention is not limited to the above-described embodiments but includes modifications of the above-described embodiments and appropriate combinations of these modifications.

In the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For example, an expression of an equal state such as "same" "equal" and "uniform" shall not be construed as indicating only the state in which the feature is strictly equal, but also includes a state in which there is a tolerance or a difference that can still achieve the same function.

Furthermore, in the present specification, an expression of a shape such as a rectangular shape or a cylindrical shape shall not be construed as only the geometrically strict shape, but also includes a shape with unevenness or chamfered corners within the range in which the same effect can be achieved.

Furthermore, in the present specification, an expression of "comprising", "including" or "having" one component is not intended to be exclusive of other components.

REFERENCE SIGNS LIST

10 Amphibious vehicle
12 Vehicle body
13 Vehicle wheel
14 Engine
16 Coolant intake port
20 Cooling device
21 Heat exchanger
22 Coolant introduction passage
23 Cooling air discharge portion
24 Cooling air discharge passage
25 Cooling water discharge portion
26 Cooling water discharge passage
31 Diaphragm
32 Biasing member
33 Passage switching portion
34 Opening
36 Fan
38 Propulsion device
39 Bypass passage
41 Pump
42 Spraying portion
44 Shared space
45 Partition member
46 Drain passage
L Waterline
F Propulsion force

The invention claimed is:

1. A cooling device for an amphibious vehicle, comprising:
a heat exchanger mounted in the amphibious vehicle;
a one single coolant introduction passage that selectively passes cooling air or cooling water introduced from an outside to the heat exchanger as a coolant;
a cooling air discharge passage through which the cooling air having passed through the heat exchanger can be discharged to a cooling air discharge portion communicating with the outside; and
a cooling water discharge passage through which the cooling water having passed through the heat exchanger can be discharged to a cooling water discharge portion communicating with the outside, wherein the cooling air discharge passage and the cooling water discharge passage are formed such that the cooling air discharge portion and the cooling water discharge portion are independent from each other.

2. The cooling device for the amphibious vehicle according to claim 1, further comprising:
a passage switching portion configured to be able to selectively switch a discharge destination of the coolant having passed through the heat exchanger to any one of the cooling air discharge passage and the cooling water discharge passage.

3. The cooling device for the amphibious vehicle according to claim 2,
wherein the passage switching portion includes:
an opening communicating between the cooling air discharge passage and the cooling water discharge passage;
a diaphragm attached to the opening from a side close to the cooling water discharge passage; and
a biasing member that elastically biases the diaphragm toward the opening.

4. The cooling device for the amphibious vehicle according to claim 1,
wherein the cooling air discharge passage has a fan provided closer to a downstream side than a branch point between the cooling water discharge passage and the cooling air discharge passage.

5. The cooling device for the amphibious vehicle according to claim 1,
wherein a downstream side of the cooling air discharge passage in relation to a branch point between the cooling water discharge passage and the cooling air discharge passage is located above a waterline of the amphibious vehicle.

6. The cooling device for the amphibious vehicle according to claim 1,
wherein a propulsion device that generates a propulsion force using the cooling water having passed through the heat exchanger is disposed in the cooling water discharge passage.

7. The cooling device for the amphibious vehicle according to claim 6, further comprising:
a bypass passage that communicates with the coolant introduction passage and the cooling water discharge passage,
wherein a portion of the coolant flowing through the coolant introduction passage can be supplied to the propulsion device through the bypass passage without passing through the heat exchanger.

8. The cooling device for the amphibious vehicle according to claim 1, further comprising:
a pump capable of pumping the cooling water to the coolant introduction passage.

9. The cooling device for the amphibious vehicle according to claim 8, further comprising:
a spraying portion capable of spraying the cooling water pumped by the pump toward the heat exchanger from an upper side.

10. The cooling device for the amphibious vehicle according to claim 1,
wherein the cooling air discharge passage and the cooling water discharge passage have a shared space provided on a side close to the heat exchanger, and
wherein the shared space is configured to be able to store the cooling water by being partitioned by a partition member and has a drain passage through which the stored cooling water can be discharged.

11. The cooling device for the amphibious vehicle according to claim 10,
wherein the partition member extends from a floor of the shared space until reaching a side above the heat exchanger.

12. The cooling device for the amphibious vehicle according to claim 10,
wherein the cooling air discharge portion is provided on a side above the partition member.

13. The cooling device for the amphibious vehicle according to claim 10,
wherein the drain passage is configured such that the drain passage is open at a timing at which the amphibious vehicle switches from a water mode to a land mode whereby the cooling water stored in the shared space is discharged.

14. An amphibious vehicle comprising the cooling device according to claim 1.

* * * * *